United States Patent [19]
Kurobe et al.

[11] Patent Number: 5,896,402
[45] Date of Patent: Apr. 20, 1999

[54] RETRANSMISSION CONTROL METHOD

[75] Inventors: Akio Kurobe, Tondabayashi; Shoichi Masaki, Katano, both of Japan

[73] Assignee: Matsushita Electric Industrial Co., Ltd., Osaka-fu, Japan

[21] Appl. No.: 08/895,809

[22] Filed: Jul. 17, 1997

[30] Foreign Application Priority Data

Jul. 18, 1996 [JP] Japan .................................. 8-189128

[51] Int. Cl.$^6$ .................................................. G08C 25/02
[52] U.S. Cl. .......................... 371/32; 371/34; 371/30; 371/33; 371/40.2; 371/40.11; 370/216; 395/200.65; 395/33
[58] Field of Search .......................... 371/32, 34, 30, 371/33, 40.2, 40.11; 370/216; 395/200.65, 33

[56] References Cited

U.S. PATENT DOCUMENTS

| | | | |
|---|---|---|---|
| 5,537,414 | 7/1996 | Takiyasu et al. | 370/347 |
| 5,610,595 | 3/1997 | Garrabrant et al. | 414/222 |

FOREIGN PATENT DOCUMENTS 6-252978   9/1994   Japan .

OTHER PUBLICATIONS

Bux W. et al. "Performance of an Improved Data Link Control Protocol" Computer Communication Technologies for the 90's. Proceeding of the Ninth International Conference, Tel Aviv, Israel, 30 Oct.–3 Nov. 1988.

M.C. Easton: "Design Choice for Selective–Repeat Retransmission Protocols" IEEE Transactions on Communications, vol. 29, No. 7, Jul. 1981, New York US.

Yu Ps et al.: "An Efficient Selective–Repeat ARQ Scheme for Satellite Channels and its Throughput Analysis" IEEE Transactions on Communications, vol. COM–29, No. 3, Mar. 1981, New York US.

Metzner J J: "A Study of an Efficient Retransmission Strategy for Data Links" NTC '77 Conference Record, Los Angeles, CA, USA, 5–7 Dec. 1977, 1977 New York, US.

Duei Tsai et al.: "Error–Correction Scheme for the NASA Deep Space Network Ground Communication Facility Upgrade" IEEE Conference on Communications, Boston, Mass. Jun. 1989.

Fantacci R: "Generalized Error Control Techniques for Integrated Service Packet Networks" IEEE Transactions on Communications, vol., 42, No. 10, Oct. 1, 1994, New York, US.

Sandoh H et al.: "A Bayesian Approach to an Optical Arq Number in Data Transmission" Electronics & Communications in Japan, Part III—Fundamental Electronic Science, vol. 76, No. 3, Mar. 1993.

*Primary Examiner*—William Grant
*Assistant Examiner*—McDieunel Marc
*Attorney, Agent, or Firm*—Wenderoth, Lind & Ponack, L.L.P.

[57] ABSTRACT

A highly efficient retransmission control method is achieved by preventing the order of data from being changed by one revolution of a modulo without adding extra overhead. The transmitting side continues to continuously transmit frames assigned frame numbers circulating by a modulo M to the receiving side. Upon detecting an error in the received frame, the receiving side returns a reject provided with the frame number of the frame. The transmitting side retransmits the frame to the receiving side in response to the reject. In a case where such retransmission control is carried out, the maximum number of times Nr a reject of the same frame is returnable is previously determined. The receiving side discontinues the return of the reject of the same frame until the number of times of the return exceeds the maximum number of times Nr. Consequently, the return of the reject of the same frame can be discontinued before the modulo of the frame number revolves once. As a result, it is possible to prevent the order of data from being changed by one revolution of the modulo.

24 Claims, 13 Drawing Sheets

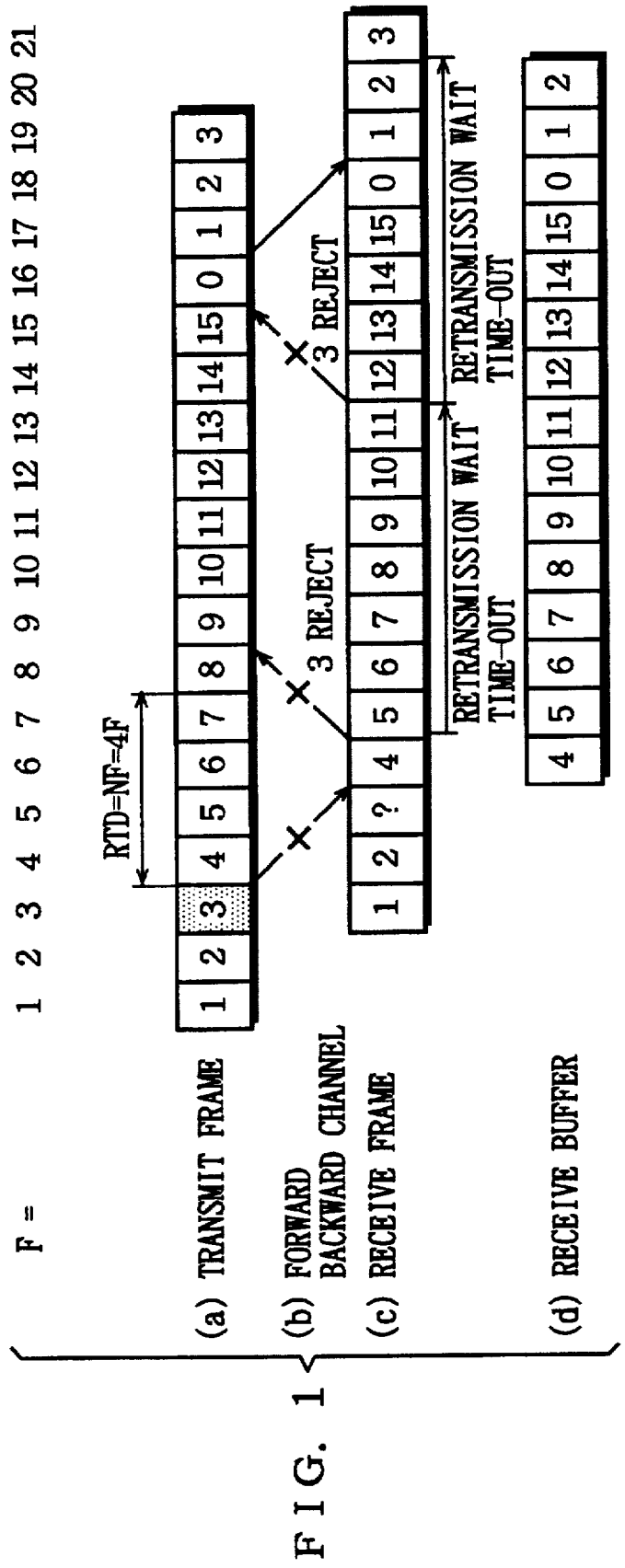
F I G. 1

RETRANSMISSION CONTROL METHOD

BACKGROUND OF THE INVENTION

1. Field of the Invention

The present invention relates generally to a retransmission control method, and more particularly, to a retransmission control method of performing error correction when a transmission error occurs in data by retransmitting the data.

2. Description of the Prior Art

A mobile/portable data communication service is one of the services whose demand toward realization has increased greatly in recent years, as represented by a word "Mobile Multimedia". A personal handyphone system (PHS) has been expected to be an infrastructure having a high bearer transmission rate, i.e., 32 kbit/s and being effective in realizing a multimedia in a radio environment. In order to realize data communication in a mobile communication environment which is lower in line quality than a wire circuit, an error control technique plays an important role. As an example of such an error control technique, a retransmission control method of an SR (Selective-Repeat) system has been conventionally proposed.

In the conventional SR retransmission control method, blocks are continuously transmitted even during a round trip delay period (RTD), and only a frame to which a reject (a retransmission request) is returned is retransmitted. Therefore, the receiving side has a buffer for preserving correct frames received after a frame including an error. If there is no error in a retransmitted frame, the receiving side outputs the retransmitted frame and the frames stored in the buffer to a user in accordance with the order of their frame numbers.

FIG. 12 illustrates a frame structure in the conventional SR retransmission control system. Portion (a) of FIG. 12 illustrates the structure of a frame for transmitting transmit data (hereinafter referred to as a transmit frame), and portion (b) of FIG. 12 illustrates the structure of a reject frame returned from the receiving side when an error occurs in received data or a retransmission wait timer times out.

As shown in portion (a) of FIG. 12, the transmit frame comprises a transmit data block 401, a frame number 402, an error-detecting code 403, and a synchronous flag 404 for frame synchronization. On the other hand, as shown in portion (b) of FIG. 12, the reject frame comprises a frame number 402, a reject code 405, and an error-detecting code 406 of a return frame. The transmission side divides the transmit data into a plurality of transmit data blocks 401, adds the frame number 402 to each of the transmit data blocks 401, then generates the error-detecting code 403 for making it possible to detect whether an error occurs in the data block or the frame number, and appends the error-detecting code 403 to the transmit data block 401. There are several methods of frame synchronization. A method of attaching a synchronous code with a particular bit pattern to the head of a frame is illustrated herein. Examples of the frame number include a modulo 8 (3 bits), a modulo 16 (4 bits), a modulo 32 (5 bits), a modulo 64 (6 bits), and a modulo 128 (7 bits). Generally speaking, the frame number of a modulo M starts with zero, is increased by one for each frame, and is returned to zero if it exceeds M−1, after which the foregoing is cyclically repeated.

FIG. 13 illustrates one example of transmission/receiving timing in the conventional SR retransmission control system. Portion (a) of FIG. 13 illustrates the timing of transmit frames and frame numbers, portion (b) of FIG. 13 illustrates the presence or absence of frame errors and return frames, portion (c) of FIG. 13 illustrates the timing of received frames and frame numbers, and portion (d) of FIG. 13 illustrates the frame numbers of data stored in a receive buffer.

In the specification, a frame assigned a frame number n shall be denoted by "frame (n)".

In the example shown in FIG. 13, an error occurs in frame (3), it is judged that there is an error in the frame (3) at the time where frame (4) is received, and a reject corresponding to the frame (3) is returned by a return frame. A round trip delay period (RTD) is a period corresponding to four frames. Since the round trip delay period deviates by a period corresponding to one frame in order to know the frame number of an error frame, however, a period corresponding to five frames (=RTD+1=4+1) is required until the return frame is returned to the transmission side. The transmission side continues to transmit new frames until it receives the reject with respect to the frame (3). As soon as the reject with respect to the frame (3) is received, the frame (3) is retransmitted. A case where an error occurs also in the retransmitted frame (3) is illustrated herein. The receiving side discards the received error frame or holds the error frame when it is later used for error correction, and eventually returns the reject with respect to the frame (3) again at the time where a time-out period (T×F) of a retransmission wait timer started from when the reject is returned has elapsed. The time-out period (T×F) of the retransmission wait timer is set to be longer than the round trip delay period (RTD). In the case shown in FIG. 13, the frame (3) reaches the receiving side without error upon being retransmitted twice. The receiving side adds data of the frame (3) to the heads of data of received frames (4) to (14) which have been stored in the buffer, and transfers the frames to a user.

As described in the foregoing, in the conventional SR retransmission control method, the new frames are continuously transmitted even during the round trip delay period (RTD), and only the frame having the reject returned is retransmitted. Even if a transmission line in which a long round trip delay period (RTD) is used, it is possible to perform efficient error correction.

FIG. 14 illustrates an example of retransmission control in a case where the round trip delay period (RTD) is a period corresponding to eight frames. FIG. 14 is the same as FIG. 13 except that the round trip delay period differs. In the case shown in FIG. 14, a modulo is 16 as in the case shown in FIG. 13. In the case shown in FIG. 14, a modulo of a transmit frame number revolves once before the second reject with respect to frame (3) reaches the transmission side. Therefore, a new frame (3) having the same frame number as that of the frame (3) which is the oldest frame which waits for retransmission on the receiving side is transmitted, and is received on the receiving side. In this case, the receiving side cannot judge whether the received frame (3) is a new frame or a retransmit frame. Thus, there occurs a situation where the receiving side adds data of the frame (3) to the heads of data of received frames (4) to (14) which have been stored in the buffer, and transfers the frames to the user regardless of the fact that the received frame (3) is a new frame. As a result, a row of data in which the order of data blocks is changed is handed to the user. It is considered that an identification bit for identifying a new or old frame is added, and the number of bits of the modulo is increased. In such a method, there arises another problem that the overhead of the frames is increased.

A method of calculating, on a network to which a plurality of terminals are connected, the number of times of retransmission Nr from a response wait period Tw and a retransmission interval Tr between the terminals and a transmission abandoning period Tk determined from the viewpoint of the response of the network is disclosed in Japanese Patent Laid-Open No. 252978/1994. In a method of calculating the number of times of retransmission which is disclosed in the gazette, the response wait period Tw is first calculated by the following equation (1):

$$Tw = K1 \cdot (Lf/Sg) \qquad (1)$$

K1: a coefficient of response wait time (K1>1)
Lf: the maximum length of a data transmission frame (bit)
Sg: an apparent transmission rate (bps)

The foregoing equation (1) holds on the assumption that the apparent transmission rate varies due to the fact that the network is used upon being divided by the plurality of terminals, and a period required to transmit a data frame in a certain data amount at a decreased transmission rate is a response wait period. In such a case, a plurality of frames are not transmitted during the response wait period, so that the effect of the SR retransmission control is not obtained. Further, the modulo does not revolve once.

In the method of calculating the number of times of retransmission which is disclosed in the above gazette, the data retransmission interval Tr is calculated by the following equation (2), and the calculated data retransmission interval Tr, the transmission abandoning period Tk determined from the viewpoint of the response of the network, and the response wait period Tw are substituted in the following equation (3), to determine the number of times of retransmission Nr:

$$Tr = K2 \cdot (Lf/Sg) \qquad (2)$$

$$Nr = (Tk - Tw)/Tr \qquad (3)$$

K2: a coefficient of a retransmission interval ($K2 \geq K1 \geq 1$)

The response of the network can be always held in a stable state by determining the number of times of retransmission in conformity with the varying apparent transmission rate, as described above.

An object of the invention which is disclosed in Japanese Patent Laid-Open No. 252978/1994 is to ensure the response of the network. It is not considered that the present invention is applied to prevention of one revolution of a modulo, not to speak of application to SR retransmission control.

SUMMARY OF THE INVENTION

An object of the present invention is to provide a highly efficient retransmission control method in which the order of data is prevented from being changed by one revolution of a modulo without adding extra overhead.

In order to attain the above-mentioned object, the present invention is characterized as follows.

A first aspect of the present invention is directed to a method of performing error correction when frames assigned frame numbers circulating by a modulo M are continuously transmitted from the transmission side to the receiving side by retransmission control with respect to the frame in which a transmission error occurs. The receiving side returns a reject (i.e., a reject indication frame) to the transmission side upon detecting an error in the received frame. The reject is provided with the frame number of the frame in which the error is detected. Upon receiving the reject, the transmission side retransmits the frame corresponding to the frame number included in the reject to the receiving side, and previously determines the maximum number of times Nr the reject of the same frame is returnable while the modulo of the frame number revolves once. The receiving side discontinues the return of the reject of the same frame before the number of times of the return exceeds the maximum number of times Nr.

As described in the foregoing, according to the first aspect of the present invention, the maximum number of times Nr the reject of the same frame is returnable is previously determined while the modulo of the frame number revolves once, and the return of the reject of the same frame is discontinued before the number of times the reject is returned exceeds the maximum number of times Nr, whereby it is possible to prevent the order of data from being changed by one revolution of the modulo without adding extra overhead.

A second aspect of the present invention is characterized in that in the first aspect, the maximum number of times Nr the reject is returnable is determined on the basis of the speed at which the modulo advances when the return of the reject only of an arbitrary frame is repeated, the retransmission of the frame with respect to the reject is not executed each time, and all the other frames are transmitted without error.

According to the second aspect of the present invention, the maximum number of times Nr the reject is returnable is determined upon presuming the worst case where the modulo of the frame number advances earliest, whereby the return of the reject of the same frame can be reliably discontinued before the modulo revolves once even if any situation occurs.

A third aspect of the present invention is characterized in that in the second aspect, letting t be a time-out period of a timer for defining the time limit from when the reject is returned to when the retransmitted frame is received, p be a suitable margin, and F be a period required to transmit one frame, the maximum number of times Nr is determined as a positive integer satisfying the following equation (a):

$$Nr \leq \{(M-1) \times F - p\}/t \qquad (a)$$

A fourth aspect of the present invention is characterized in that in the third aspect, letting $t = T \times F$ and $p = P \times F$, the maximum number of times Nr is determined as a positive integer satisfying the following equation (b):

$$Nr \leq (M-1-P)/T \qquad (b)$$

A fifth aspect of the present invention is directed to a method of performing error correction when frames assigned frame numbers circulating by a modulo M are continuously transmitted from the transmitting side to the receiving side by retransmission control with respect to the frame in which a transmission error occurs. Upon detecting an error in the received frame, the receiving side returns, a reject provided with the frame number of the frame in which the error is detected to the transmitting side. The transmitting side retransmits, upon receiving the reject, the frame corresponding to the frame number included in the reject to the receiving side. The receiving side predicts the frame number of the indiscernible received frame from the frame number of the discernible received frame, and discontinues, when the predicted frame number reaches a number preceding the frame number of the oldest frame out of the frames which wait for retransmission, the return of the reject to the oldest frame upon making the transition to an abnormal state.

As in the above-mentioned first to fifth aspects of the present invention, even in the worst case first presumed, when the upper limit of the number of times of retransmission is so determined that the order of data is not changed by one revolution of the modulo, in fact, a case where the modulo does not revolve once even with executing one more retransmission could frequently occur. In the fifth aspect of the present invention, the number of times of retransmission is made as large as possible, and the order of data is prevented from being changed by one revolution of the modulo by not first determining the number of times of retransmission but performing processing for restricting the number of times of retransmission presuming the worst case only with respect to the frames which are indiscernible by errors successively making use of known information on the receiving side.

A sixth aspect of the present invention is characterized in that in the fifth aspect, upon receiving a new frame, the receiving side sets the frame number of the new frame as an initial value in a modulo M counter, counts the number of continuously received indiscernible frames which are received after receiving the new frame by the counter, and makes the transition to the abnormal state when a count value of the counter reaches the number preceding the frame number of the oldest frame out of the frames which wait for retransmission.

A seventh aspect of the present invention is directed to a method of performing error correction when frames assigned frame numbers circulating by a modulo M are continuously transmitted from the transmission side to the receiving side by retransmission control with respect to the frame in which the transmission error occurs. Upon detecting an error in the received frame, the receiving side returns a reject provided with the frame number of the frame in which the error is detected to the transmitting side. Upon receiving the reject, the transmitting side retransmits the frame corresponding to the frame number included in the reject to the receiving side. The receiving side predicts the frame number of the indiscernible received frame from the frame number of the discernible received frame, and makes the transition to a judgment wait state when the predicted frame number reaches a number preceding the frame number of the oldest frame out of the frames which wait for retransmission. Upon receiving a frame having the same frame number as that of the oldest frame out of the frames which wait for retransmission after making the transition to the judgment wait state, the receiving side holds the received frame as a frame which waits for judgment, and judges, on the basis of the frame number of the frame received after holding the frame which waits for judgment, whether or not the frame which waits for judgment is a retransmit frame.

In the above-mentioned fifth and sixth aspects of the present invention, when the predicted frame number coincides with the number preceding the frame number of the oldest frame out of the frames which wait for retransmission, the receiving side unconditionally discontinues the return of the reject to the oldest frame upon making the transition to the abnormal state. Therefore, a frame is discarded, although it is actually a retransmission request frame. According to the seventh aspect of the present invention, therefore, when the predicted frame number reaches the frame number preceding the frame number of the oldest frame out of the frames which wait for retransmission, the receiving side makes the transmission to the judgment wait state once. When a frame subsequently received is a frame having the same frame number as that of the oldest frame out of the frames which wait for retransmission, the receiving side holds the frame as a frame which waits for judgment, and judges whether or not the frame which waits for judgment is a retransmit frame on the basis of the frame number of a frame received after holding the frame which waits for judgment. There arises no problem that the received frame is discarded irrespective of the fact that it is a retransmit frame as in the fifth and sixth aspects of the invention, so that efficient error correction can be made.

An eighth aspect of the present invention is characterized in that in the seventh aspect, upon receiving a new frame, the receiving side sets the frame number of the new frame as an initial value in a modulo M counter, counts the number of continuously received indiscernible frames which are received after receiving the new frame by the counter, and makes the transition to the judgment wait state when a count value of the counter reaches the number preceding the frame number of the oldest frame out of the frames which wait for retransmission.

A ninth aspect of the present invention is characterized in that in the eighth aspect, upon making the transition to the judgment wait state, the receiving side stores the frame number of the newest frame out of the new frames received before making the transition to the judgment wait state as a first frame number. Upon receiving the new frame or receiving a frame having the same frame number as the frame which waits for judgment after holding the frame which waits for judgment, the receiving side stores the frame number of the received frame as a second frame number, and makes the transition to a state for judging whether or not the judgment wait state is released in a case where the frame number of the oldest frame out of the frames which wait for retransmission is more than the second frame number, or a case where the first frame number is more than the frame number of the oldest frame out of the frames which wait for retransmission and the second frame number is more than the first frame number, while discontinuing the return of the reject to the oldest frame upon making the transition to the abnormal state in the other case.

A tenth aspect of the present invention is characterized in that in the ninth aspect, upon making the transition to the state for judging the release of a judgment wait, the receiving side judges whether or not it holds the frame which waits for judgment, and releases the judgment wait state and judges that the frame which waits for judgment is a retransmit frame if it holds the frame which waits for judgment, while setting the second frame number in the first frame number, setting a count value of the counter in the second frame number, clearing the second i frame number and continuing the judgment wait state if it does not hold the frame which waits for judgment.

An eleventh aspect of the present invention is characterized in that in the tenth aspect, even after making the transition to the judgment wait state, the receiving side counts the number of continuously received indiscernible frames by the counter, and discontinues the return of the reject to the oldest frame upon making the transition to the abnormal state when the count value of the counter revolves once.

A twelfth aspect of the present invention is characterized in that in the ninth aspect, upon making the transition to the state for judging the release of a judgment wait, the receiving side judges whether or not it holds the frame which waits for judgment, releases the judgment wait state, and judges that the frame which waits for judgment is a retransmit frame if it holds the frame which waits for judgment, while setting the second frame number in the count value of the counter, clearing the second frame number and continuing the judgment wait state if it does not hold the frame which waits for judgment.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing one example of retransmission control, in a case where the frame number is a modulo 16, carried out when the modulo revolves at least once;

FIG. 10 is a diagram showing a general layer structure of a multiplex transmission device for multiplexing and transmitting video data, audio data, computer data, and the like;

DESCRIPTION OF THE PREFERRED EMBODIMENTS

Figure 2:
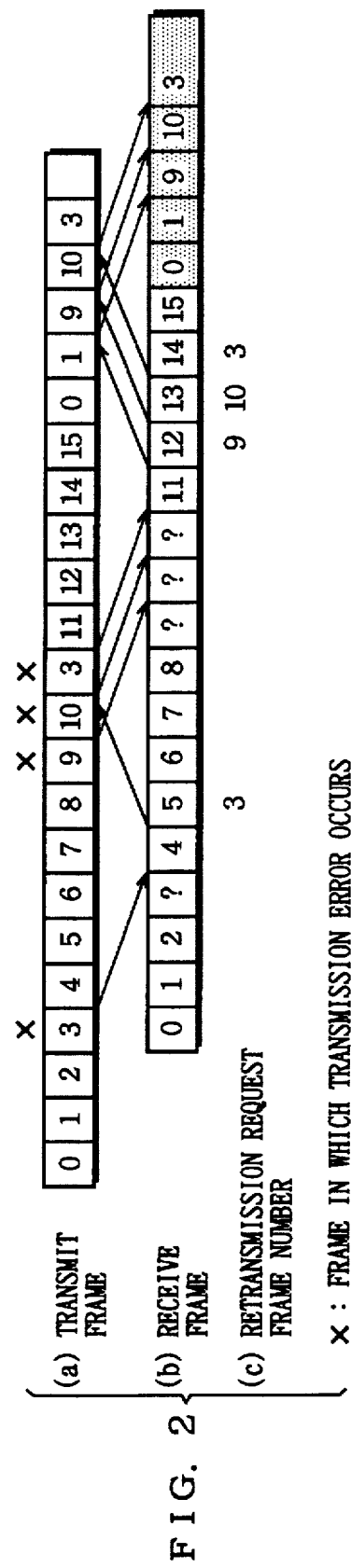
FIG. 2 is a diagram showing one example of retransmission control in a case where the frame number is a modulo 16.

Referring now to the drawings, embodiments of the present invention will be described.
(First Embodiment)

FIG. 1 illustrates one example of retransmission control, in a case where the frame number is a modulo 16, carried out when the modulo revolves at least once. At described above, when the modulo revolves once, the frame number of a frame which waits for retransmission and the frame number of a new frame produced due to one revolution of the modulo may, in some cases, coincide with each other on the receiving side. In this case, there arises a problem that the difference between both the frames cannot be identified on the receiving side. FIG. 1 illustrates a case where such a problem arises with respect to a frame (3).

The receiving side first returns a reject (i.e., a reject indication frame) when an omission occurs in the frame number of a received frame. As shown in FIG. 1, when there is an error in the frame (3), an omission in a frame number 3 is detected at the time where a frame (4) is correctly received subsequently to a frame (2), and a reject corresponding to the frame (3) is returned by the receiving side. At this time, on the transmission side, the total of a period which is one-half a round trip delay period (a period corresponding to n frames) and a period corresponding to one frame has already elapsed. Since n=4F, a period corresponding to three frames has elapsed. Meanwhile, the transmission side continues to transmit new frames, whereby the modulo advances by three.

The following two cases are considered as the situations where the receiving side returns the reject corresponding to the frame (3) again. The first case is a case where an error occurs in the frame (3) retransmitted in response to the first reject (which reaches the receiving side after a lapse of a period corresponding to (n+1) frames). The second case is a case where an error occurs in the first reject, and the transmission side cannot retransmit the frame (3). In either case, the receiving side immediately returns the second reject with respect to the frame (3) when it detects a time-out of a retransmission wait timer started at the time when the receiving side returned the first reject. Consequently, the time when the second reject reaches the transmission side is the same in either case. However, the advancement of the modulo in the first case is later than that in the second case by one frame because the retransmit frame (3) is transmitted in the first case. That is, an error occurs in a frame of a certain number, and a reject corresponding to the frame is returned. When the error occurs entirely in the reject, and no errors occur in the other frames, the modulo advances quickest. A case where the modulo revolves once immediately before the retransmission wait timer times out, and a new frame having the same number as the frame number of a frame which is awaited for retransmission by the receiving side is then received by the receiving side is considered to be the worst case.

When the worst case is presumed, the following equation (4) holds, letting n be a round trip delay period, M be the number of modulos, t be a time-out period of the retransmission wait timer, Nr be the upper limit of the number of times of retransmission, F be a period corresponding to one frame, and p be a suitable margin:

$$n+F+Nr\times t - n + p \leq M \times F \qquad (4)$$

From the foregoing equation (4), the upper limit of the number of times of retransmission Nr is expressed by the following equation (5):

$$Nr \leq (M \times F - p - F)/t \qquad (5)$$

in a case where t=T×F and p=P×F, the foregoing equation (5) is changed into the following equation (6):

$$Nr \leq (M-P-1)/T \qquad (6)$$

Since the number of times of retransmission is a positive integer, the upper limit of the number of times of retransmission Nr eventually becomes a positive integer satisfying the equation (5) or (6).

In the first embodiment, the receiving side so restricts the number of times of retransmission of an error frame as not to exceed the upper limit of the number of times of retransmission calculated in the above-mentioned manner. Consequently, it is possible to prevent the order of data from being changed by one revolution of the modulo without adding extra overhead.

Although in the above-mentioned first embodiment, a case where the modulo is 16 is taken as an example, the value of the modulo may be a value other than 16.

In the first embodiment, the suitable margin P is a margin considering that the reject corresponding to the frame number 3 is delayed when errors continuously occur in several frames subsequent to the frame assigned the frame number 3, for example. In the case of such a system configuration that an error-detecting code is also added to a frame number, to strictly detect an error in a frame number, however, P may be zero.

A round trip delay period in a network may be measured prior to communication, to calculate the number of times of retransmission each time in conformity with the measurement. The number of times of retransmission may be calculated by both the transmission side and the receiving side. Alternatively, either one of the transmission side and the receiving side may calculate the number of times of retransmission and report the results thereof to the receiving side or the transmission side. When the number of times of retransmission is also restricted by another factor (for example, delay of video data), the smaller one of the number of times of retransmission Nr determined by the first embodiment and the number of times of retransmission determined by the other factor may be employed.

In the worst case first presumed as in the first embodiment, when the upper limit of the number of times of retransmission is so determined that the order of data is not changed by one revolution of the modulo, a case where the modulo does not revolve once, even if retransmission is made once more, may actually frequently occur. In second and third embodiments described below, the number of times of retransmission is made as large as possible, and the order of data is prevented from being changed by one revolution of the modulo not by first determining the number of times of retransmission but by successively making use of known information on the receiving side and presuming the worst case only with respect to frames which are indiscernible by errors.

(Second Embodiment)

Figure 3:
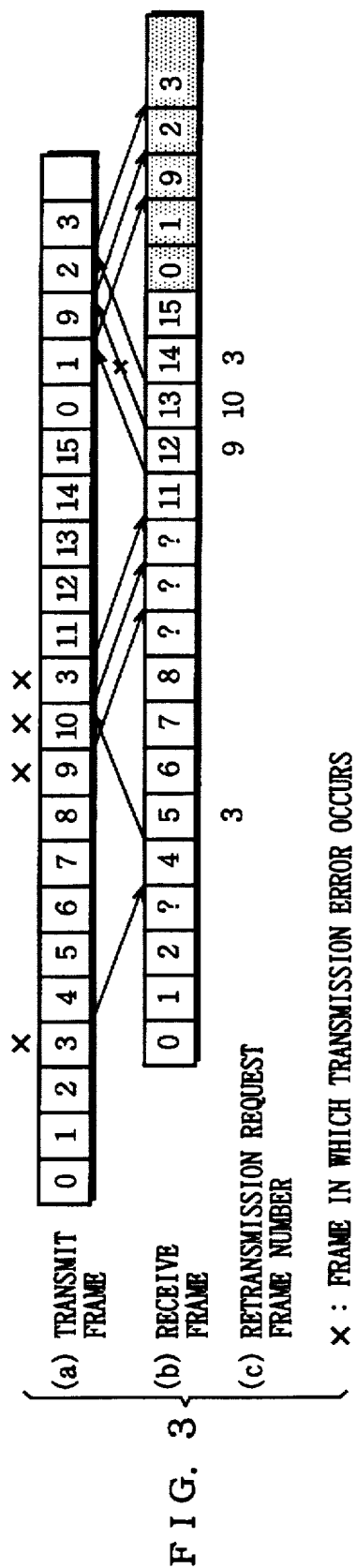
FIG. 3 is a diagram showing another example of retransmission control in a case where the frame number is a modulo 16.

FIGS. 2 and 3 illustrate one example of retransmission control in a case where the frame number is a modulo 16. In FIGS. 2 and 3, "x" indicates a frame in which a transmission error occurs. FIG. 2 shows an example of retransmission control in a case where the frame number of the oldest frame of the frames which awaiting retransmission on the receiving side is 3, and the frame number of a new frame advances to 1 before a retransmit frame of the frame number 3 is received. On the other hand, FIG. 3 illustrates an example of retransmission control in a case where the frame number of the oldest frame of the frames which awaiting retransmission on the receiving side is 3, and the frame number of a new frame advances to 2 before a retransmit frame of the frame number 3 is received.

Figure 4:
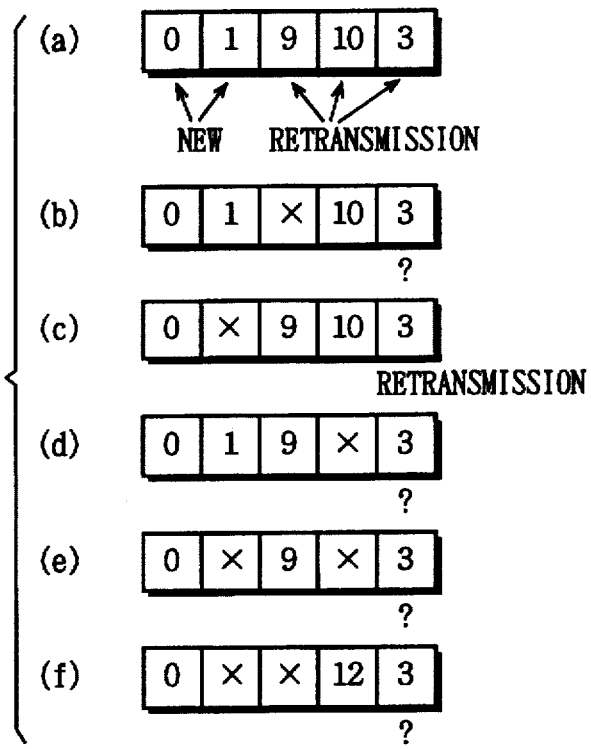
FIG. 4 is a diagram showing received frames in a cross-hatched portion shown in FIG. 2 in a case where a transmission error as shown in FIG. 2 occurs.
Figure 5:
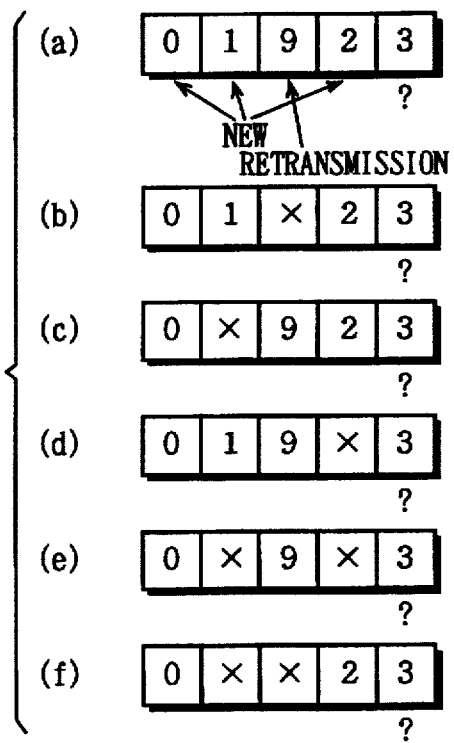
FIG. 5 is a diagram showing received frames in a cross-hatched portion shown in FIG. 3 in a case where a transmission error as shown in FIG. 3 occurs.

FIGS. 4 and 5 respectively illustrate received frames in the crosshatched portions shown in FIGS. 2 and 3 in a case where the transmission errors as shown in FIGS. 2 and 3 occur. Portion (a) of FIGS. 4 and portion (a) of 5 illustrate the received frames in a case where all the frames are received without error, and portions (b)–(f) of FIGS. 4 and portions (b)–(f) of FIGS. 5 illustrate the received frames in a case where the frames with "X mark" are received in error.

As shown in portion (a) of FIG. 5, when a new frame (2) is received before a frame (3) is received, it is impossible to determine whether the received frame (3) is a retransmit frame or a new frame on the receiving side. The modulo revolves once if the received frame (3) is a new frame, and does not revolve once if the received frame (3) is a retransmit frame. That is, the receiving side cannot judge, upon receiving a frame assigned a number preceding the frame number of the oldest frame of the frames awaiting retransmission, whether or not the frame has revolved once. On the other hand, as shown in portion (a) of FIG. 4, when retransmit frames (9) and (10) succeed a new frame (1), and a frame (3) is received in a state where a new frame (2) is not received, the receiving side can judge that the receive frame (3) is clearly a retransmit frame.

When an error occurs in any one of the frames after the new frame (1) is received, as shown in portions (b) and (d) of FIGS. 4 and 5, there is a possibility that the frame is the new frame (2), whereby the receiving side cannot judge whether the receive frame (3) is a new frame or a retransmit frame. In the cases shown in portion (c) of FIGS. 4 and 5, the receiving side cannot judge whether a first error frame is the frame (1) or the other frame. In the case shown in portion (c) of FIG. 4, however, even if it is assumed that the first error frame is the frame (1), the receiving side can judge that the receive frame (3) is a retransmit frame. On the other hand, in the case shown in portion (c) of FIG. 5, at the time where the error frame is received, even if it is assumed that the error frame is the frame (1), there is a possibility that the modulo has not yet revolved once. At the time where the frame (2) is thereafter received, however, the receiving side cannot judge whether the subsequently received frame (3) is a new frame or a retransmit frame.

In each of the cases shown in portions (e) and (f) of FIGS. 4 and 5, there is a possibility that the first error frame is the frame (1). Assuming that the first error frame is the frame (1), there is a possibility that the second error frame is the frame (2). At the time where the second error frame is received, therefore, the receiving side cannot judge whether the subsequently received frame (3) is a new frame or a retransmit frame.

As can be seen from the foregoing consideration, when the number of error frames is counted using the frame number of the newest known frame as an initial value, and the count value is a number preceding the frame number of the oldest frame of the frames awaiting retransmission, it is impossible to determine whether a frame having the same frame number as the frame number of the oldest frame of the frames awaiting retransmission, the subsequently received frame, is a new frame or a retransmit frame.

Making use of the above-mentioned principle, it is possible to easily judge one revolution of the modulo presuming the worst case only with respect to frames which are indiscernible by errors utilizing known information by setting the frame number of the frame as an initial value in a modulo M counter when a new frame is received on the receiving side, incrementing the count value of the counter every time a frame whose frame number may include an error is received, and assuming that an abnormal state occurs at a time when the count value coincides with a number preceding the frame number of the oldest frame of the frames awaiting retransmission to which a reject should be returned.

Every time the new frame is received, the frame number of the received frame is set as an initial value in the counter.

When the retransmit frame is received, however, the count value is not incremented.

Figure 6:
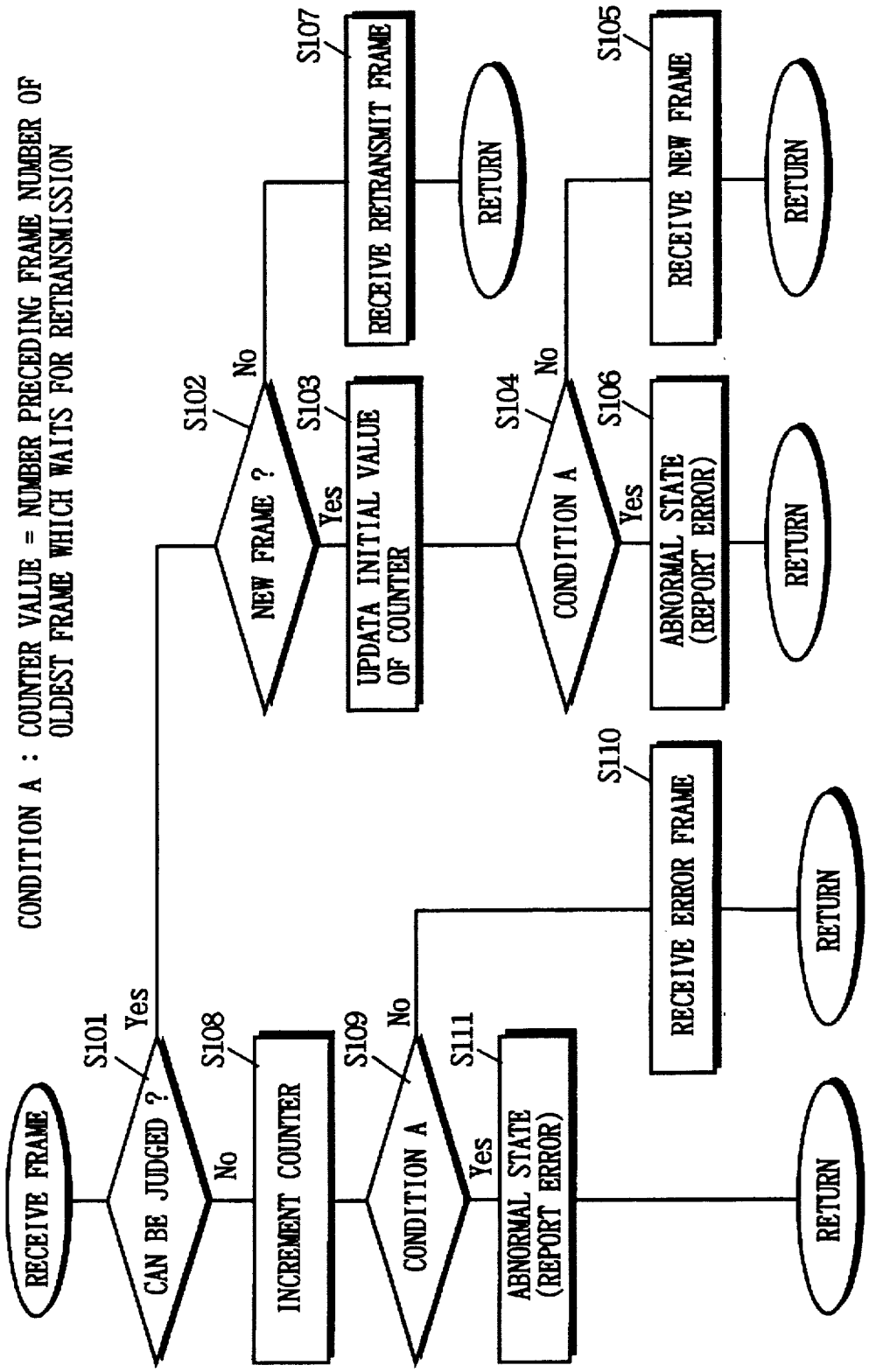
FIG. 6 is a flow chart showing operations in a second embodiment of the present invention.

FIG. 6 is a flow chart showing operations in the second embodiment of the present invention, which particularly shows a modulo judgment routine passing every time a frame is received. In FIG. 6, the receiving side first judges whether or not there is an error in a receive frame (step S101). When there is no error in the receive frame, the receiving side judges whether the receive frame is a new frame (step S102). When the receive frame is a new frame, the receiving side sets the frame number of the frame as an initial value of a counter (step S103). The receiving side then judges whether or not the count value of the counter coincides with a number preceding the frame number of the oldest frame of the frames awaiting retransmission (step S104). At this time, the receiving side brings a new frame into a received state (step S105) if the count value of the counter does not coincide with the frame number preceding the frame number of the oldest frame, to terminate the processing. On the contrary, if they coincide with each other, it is assumed that an abnormal state occurs (step S106), to terminate the processing. When a frame received without error is a retransmit frame, the receiving side brings the retransmit frame into a received state (step S107), to terminate the processing. When there is an error in the received frame, and it cannot be judged whether the received frame is a new frame or a retransmit frame, the receiving side increments the count value of the counter (step S108), and judges whether or not the count value of the counter coincides with a number preceding the frame number of the oldest frame of the frames awaiting retransmission (step S109). At this time, the receiving side brings an error frame into a received state (step S110) if the count value of the counter does not coincide with the frame number preceding the frame number of the oldest frame, to terminate the processing. On the contrary, if they coincide with each other, it is assumed that an abnormal state occurs (step S111), to terminate the processing.

The abnormal state detected in the step S106 or S111 is reported to an upper layer. The upper layer controls a lower layer so as to discontinue further retransmission of the oldest frame of the frames awaiting retransmission.

As described in the foregoing, according to the second embodiment, the number of times of retransmission can be made as large as possible, and data can be prevented from being changed by one revolution of the modulo not by first determining the number of times of retransmission but by performing processing for restricting the number of times of retransmission presuming the worst case only with respect to frames which are indiscernible by errors successively making use of known information on the receiving side.

Although in the second embodiment, description is made in view of a case where the modulo is 16 as an example, the value of the modulo may be a value other than 16.

In the second embodiment, in a case where an error-detecting code other than data is added to a frame number and it can be determined that there is no error in the frame number even if there is an error in a data portion, the number of times of retransmission can be further increased if the frame is handled as a new frame or a retransmit frame.

The number of times of retransmission is limited to the number of times of retransmission determined by the other factor (for example, the limit of delay time of a video). When the abnormal state defined in the second embodiment occurs before the number of times of retransmission reaches the defined number of times of retransmission, further retransmission may be discontinued and shifted to such processing that reports the abnormal state to the upper layer or the like.

(Third Embodiment)

In the second embodiment, when the count value of the counter coincides with the number preceding the frame number of the oldest frame of the frames awaiting retransmission, it is unconditionally considered that an abnormal state occurs (that is, a state where it cannot be determined whether a frame having the same frame number as those of the subsequently received frames awaiting retransmission is a new frame after one revolution of the modulo or a frame awaiting retransmission). Therefore, a frame is discarded, although it is actually a retransmission request frame. This will be described in more detail using FIG. 7.

Figure 7:
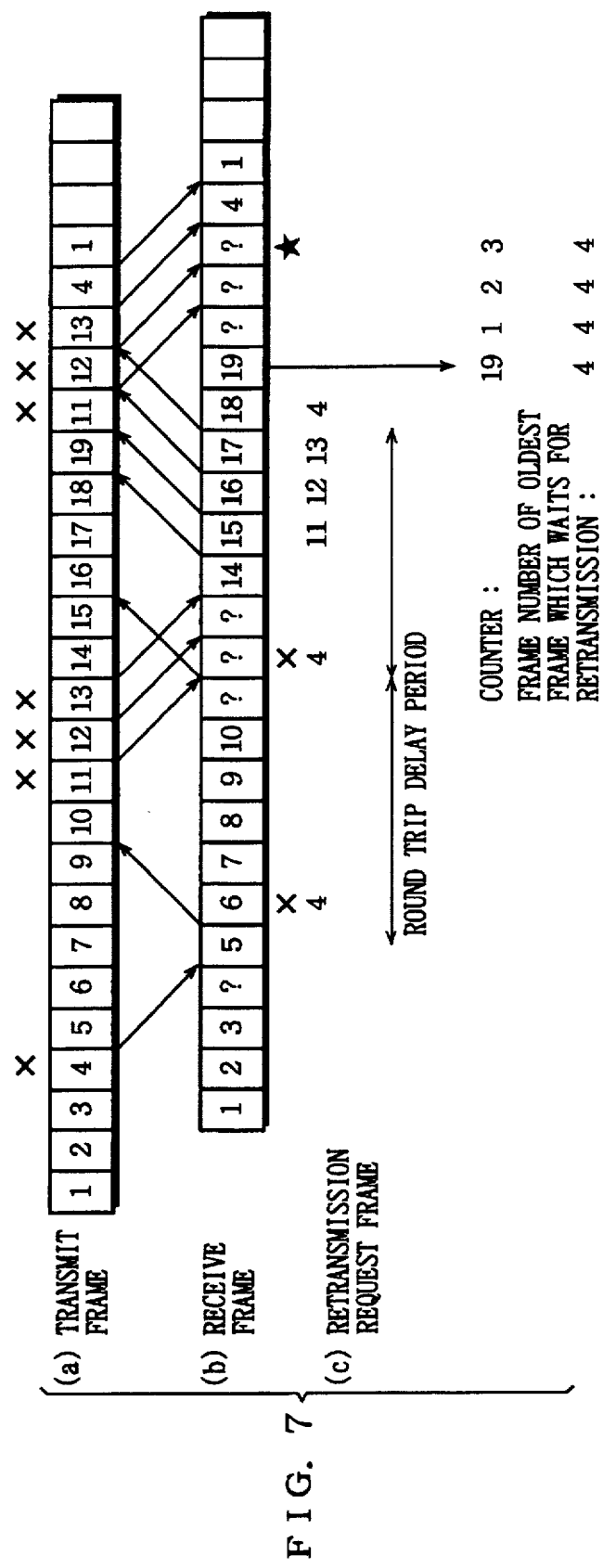
FIG. 7 is a diagram showing an example of such retransmission control that a problem occurs when an abnormal state occurs in the second embodiment of the present invention.

FIG. 7 is a diagram showing an example of retransmission control such that a problem occurs in a case where it is judged that an abnormal state has occurred in the second embodiment. Portion (a) of FIG. 7 illustrates a row of frames which are transmitted by the transmission side, where "x" means that a transmission error occurs in the transmitted frame, so that the frame number of the frame cannot be specified on the receiving side. Portion (b) of FIG. 7 illustrates a row of frames which are received by the receiving side, where "?" indicates a frame whose frame number cannot be specified. Portion (c) of FIG. 7 illustrates the frame number of a retransmission request frame, where "x" means that a transmission error occurs in a reject which is a retransmission request, so that the retransmission request frame cannot be specified on the transmission side, and "★" indicates the time when it is judged that an abnormal state occurs in the above-mentioned second embodiment. In FIG. 7, it is assumed that the number of modulos is 19.

The transmission side transmits frames in the order starting with the frame (1). It is herein assumed that transmission errors occur in initial transmission of frames (4), (11), (12) and (13), and transmission errors also occur in retransmission of frames (11), (12) and (13). On the other hand, the receiving side returns a reject which is a retransmission request of the frames (4), (11), (12) and (13). It is assumed that a transmission error occurs in first and second retransmission requests of the frame (4), and the retransmission request of the frame (4) is not correctly transmitted to the transmission side, so that the frame number of the oldest frame which waits for retransmission is (4).

The receiving side updates, every time it receives a new frame, the count value of the counter to the frame number of the new frame. Description is now made of operations after the time where a frame (19) is received, and the count value of the counter is updated to 19.

The receiving side updates, upon receiving the frame (19), the count value of the counter to 19. A transmission error occurs in the frames (11), (12) and (13) which are transmitted after the frame (19), so that the frame numbers of the frames cannot be specified. Therefore, the receiving side increments the count value of the counter. At the time where the receiving side receives a frame corresponding to the frame (13), the count value of the counter is 3. That is, the count value of the counter coincides with the number preceding the frame number of the oldest frame awaiting retransmission. As a result, the receiving side makes the transition to the abnormal state, to discard the frame (4) which should be subsequently received.

As described in the foregoing, in the example of the retransmission control shown in FIG. 7, it is judged that the modulo advances, although the frames (11), (12) and (13) which are retransmit frames are transmitted after the frame (19) is transmitted, the count value of the counter is incremented. As a result, the receiving side makes the transition to the abnormal state, to discard the frame (4), although the frame (4) must be inherently handled as a retransmit frame.

In the third embodiment, in case the receiving side cannot specify the frame number of a received frame when the count value of the counter reaches a number preceding the frame number of the oldest frame awaiting retransmission, the receiving side does not unconditionally make the transition to an abnormal state as in the above-mentioned second embodiment. That is, the receiving side makes the transition to a judgment wait state for judging whether it should make the transition to an abnormal state by the frame number of a new frame subsequently received. Consequently, the above-mentioned problem is solved. The operations will be described in more detail using FIGS. 8 and 9.

Figure 8:
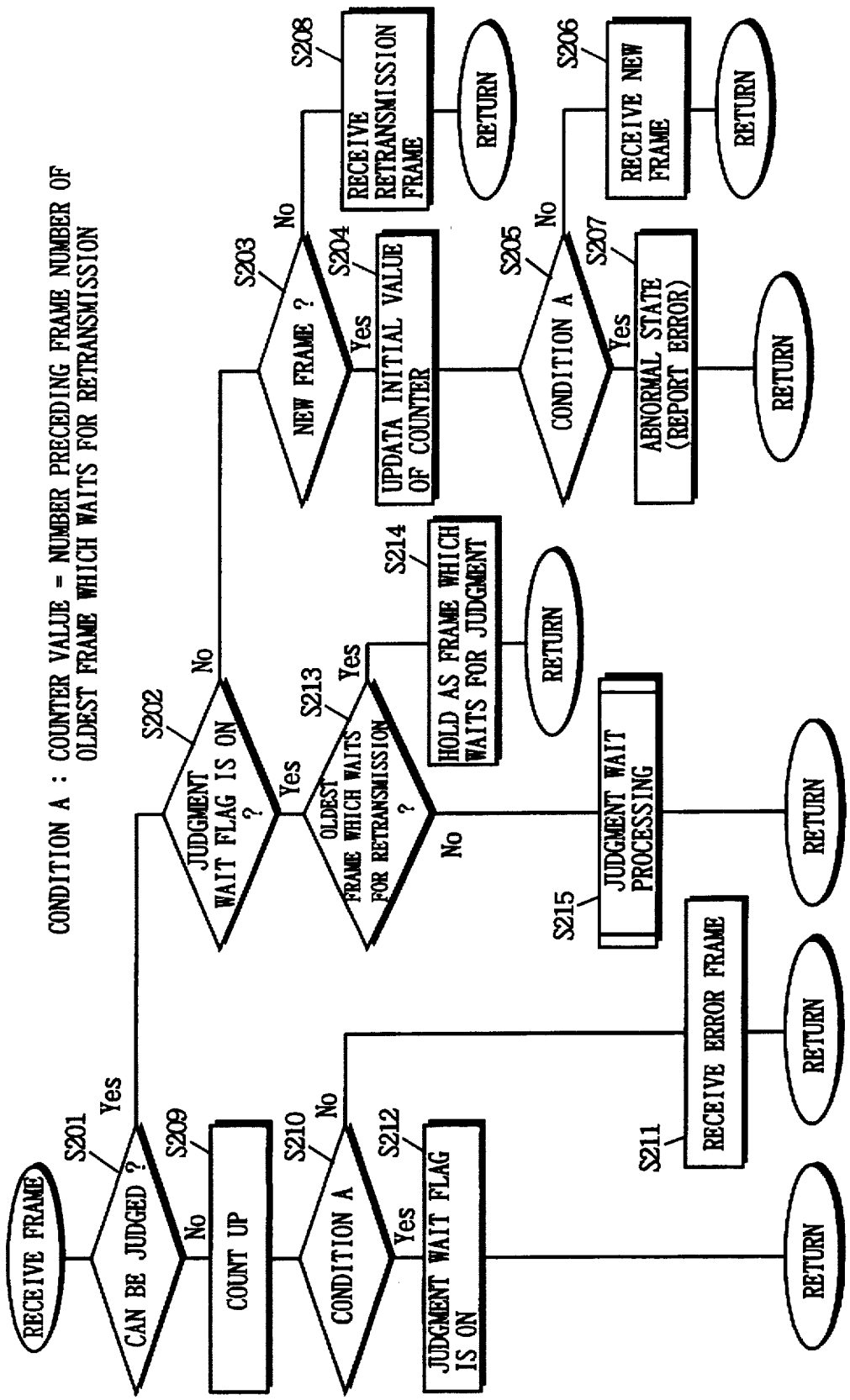
FIG. 8 is a flow chart showing an algorithm in a retransmission control method according to a third embodiment of the present invention.

FIG. 8 is a flow chart showing an algorithm of a retransmission control method according to a third embodiment of the present invention.

The receiving side judges, upon receiving a frame, whether or not there is an error in the receive frame (step S201). When there is no error in the received frame, the receiving side judges whether or not a judgment wait flag is turned on (step S202). When the judgment wait flag is not turned on, the receiving side judges whether or not the receive frame is a new frame (step S203).

When the receive frame is a new frame in the foregoing step S203, the receiving side updates the value of the counter to the frame number of the receive frame (step S204). The receiving side judges whether or not the count value of the counter coincides with the number preceding the frame number of the oldest frame of the frames awaiting retransmission (step S205). At this time, the receiving side brings a new frame into a received state (step S206) if the count value of the counter does not coincide with the number preceding the frame number of the oldest frame, to terminate the processing. On the contrary, if they coincide with each other, it is assumed that an abnormal state occurs (step S207), to terminate the processing. When a frame received without error is a retransmit frame, the receiving side brings the retransmit frame into a received state (step S208), to terminate the processing.

In the foregoing step S201, when there is an error in the receive frame, and it cannot be judged whether the received frame is a new frame or a retransmit frame, the receiving side increments the counter (step S209), and judges whether or not the count value of the counter coincides with the number preceding the frame number of the oldest frame of the frames awaiting retransmission (step S210). At this time, the receiving side brings an error frame into a received state (step S211) if the count value of the counter does not coincide with the frame number preceding the frame number of the oldest frame, to terminate the processing. On the contrary, if they coincide with each other, the judgment wait flag is turned on (step S212), to terminate the processing.

When there is no error in the received frame in the foregoing step S201 and the judgment wait flag is turned on in the foregoing step S202, the receiving side judges whether or not the received frame is a frame having the same frame number as that of the oldest frame of the frames awaiting retransmission (step S213). When the received frame is a frame having the same frame number as that of the oldest frame of the frames awaiting retransmission, the receiving side holds the received frame as a judgment wait frame without discarding the frame (step S214), to terminate the processing. On the other hand, when the received frame does not have the same frame number as that of the oldest frame of the frames awaiting retransmission, the receiving side performs judgment waiting processing (step S215), to terminate the processing.

Description is now made of operations in a case where the received frame is the new frame (19) shown in FIG. 7, for example. In this case, the receiving side updates the value of the counter to 19 (step S204). Since a transmission error occurs in the frames (11), (12) and (13) which are transmitted after the frame (19), so that the frame numbers of the frames cannot be specified, the receiving side increments the count value of the counter (step S209). At the time where a frame corresponding to the frame (13) is received, the count value of the counter becomes 3. Consequently, the count value of the counter coincides with the number preceding the frame number of the oldest frame awaiting retransmission (a frame number 4) (step S210). Correspondingly, the receiving side turns the judgment wait flag on (step S212). When the receiving side then receives the frame (4), the judgment wait flag is in an "on" state (step S202), whereby it is judged whether or not the frame (4) is a frame awaiting retransmission (step S213). Since the frame (4) is a frame awaiting retransmission, it is held as a frame awaiting judgment without being discarded (step S214).

As shown in FIG. 7, the receiving side, upon receiving the new frame (1) subsequently to the frame (4), performs judgment wait processing (step S215), to release a judgment wait state or make the transition to an abnormal state.

Figure 9:
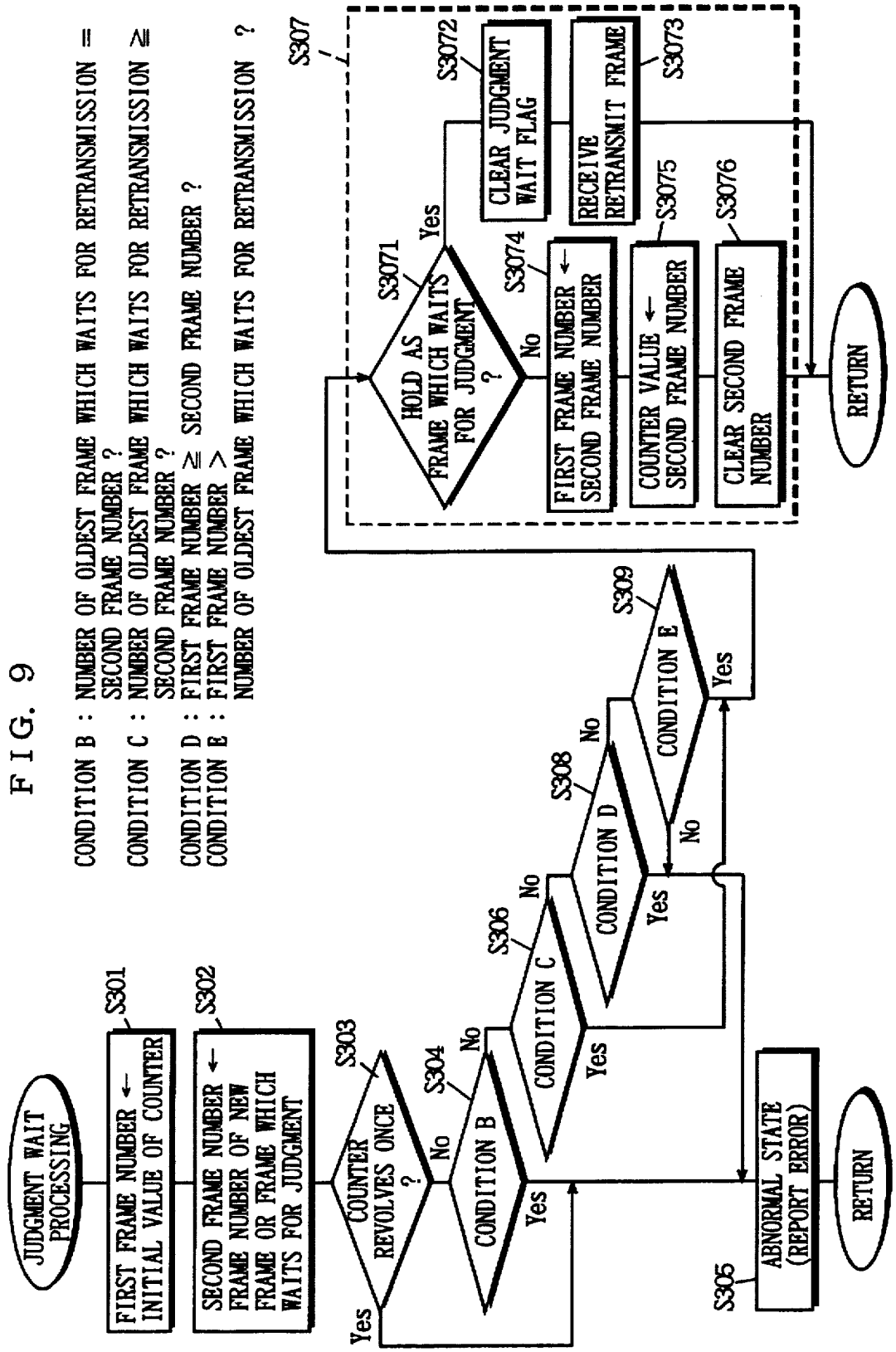
FIG. 9 is a flow chart showing more detailed operations in a subroutine step S215 (judgment waiting processing) in FIG. 8.

FIG. 9 is a flow chart showing more detailed operations in a subroutine step S215 in FIG. 8 (judgment waiting processing). Referring to FIG. 9, description is made of the details of the judgment waiting processing.

The receiving side stores, upon receiving a frame, the frame number of the newest frame (that is, an initial value of the counter) of new frames received before making the transition to a judgment wait state as a first frame number (step S301). The frame number of the received new frame is stored as a second frame number (step S302). In the step S302, even when a frame having the same frame number as that of the frame awaiting judgment is received in a state where the frame awaiting judgment is held, the frame number of the frame is stored as a second frame number.

For example, when the new frame (1) at the right end shown in FIG. 7 is received, the receiving side stores a frame number 19 (an initial value of the counter) of the newest frame (19) of the new frames which are received before making the transition to the judgment wait state as a first frame number (step S301), and stores the frame number 1 of the received new frame (1) as a second frame number (step S302).

The receiving side then judges whether or not the count value of the counter revolves once (step S303). In the example shown in FIG. 7, at the time when the new frame (1) is received, three frames whose frame numbers cannot be identified are continuously received after the new frame (19), whereby 3 is stored in the counter. In this case, the count value of the counter does not revolve once. Therefore, the receiving side performs judgment processing in the step S304. On the other hand, when the count value of the counter revolves once, it cannot be judged whether the frame (4) held as a judgment frame is a retransmit frame or a new frame, whereby the receiving side makes the transition to an abnormal state (step S305).

In the foregoing step S304, the receiving side judges whether or not the frame number of the oldest frame awaiting retransmission is equal to the second frame number stored in the foregoing step S302, to make the transition to the abnormal state if they are equal to each other (step S305). On the other hand, if they are not equal to each other, the receiving side performs judgment processing in the step S306. In the step S306, the receiving side judges whether or not the frame number of the oldest frame awaiting retransmission is not less than the second frame number, and performs processing for judging the release of a judgment wait if it is larger (step S307). On the other hand, if it is smaller, the receiving side performs judgment processing in the step S308. In the step S308, the receiving side judges whether or not the first frame number stored in the foregoing step S301 is not less than the second frame number. The receiving side makes the transition to the abnormal state (step S305) if it is larger, and performs judgment processing in the step S309 if it is smaller. In the step S309, the receiving side judges whether or not the first frame number is more than the frame number of the oldest frame awaiting retransmission. If it is larger, the receiving side performs the processing for judging the release of a judgment wait (step S307). On the other hand, it is smaller, the receiving side makes the transition to the abnormal state (step S305).

In the foregoing step S307, the receiving side judges whether or not a frame having the same frame number as the frame number of the oldest frame awaiting retransmission is received (step S3071). If the frame is received, the receiving side clears the judgment wait flag (step S3072), and processes the frame awaiting judgment as a retransmit frame (step S3073). On the other hand, if the frame having the same frame number as the frame number of the oldest frame awaiting retransmission is not received, the receiving side sets the second frame number in the first frame number (step S3074), updates the counter value using the second frame number as an initial value of the counter (step S3075), and clears the second frame number (step S3076), to continue the judgment wait state.

In the example shown in FIG. 7, the frame number 19 is stored in the first frame number, the frame number 1 is stored in the second frame number, and the frame number of the oldest frame awaiting retransmission is 4, whereby the frame (4) is handled as a retransmit frame through the steps S301, S302, S303, S304, S306, and S307.

Although in the third embodiment, in the processing for judging the release of a judgment wait in the step S307, it is judged whether or not there is a frame awaiting judgment (step S3071), after which the first frame number is set in the second frame number (step S3074), the count value of the counter is set in the second frame number (step S3075), and the second frame number is cleared (step S3076), the count value of the counter may be set in the second frame number, and the second frame number may be cleared, to continue the above-mentioned judgment wait state.

In FIG. 7, an example in which the frames (11), (12) and (13) are transmitted as retransmit frames is illustrated. When the frames (1), (2) and (3) are transmitted as new frames after the frame (19), however, the new frame (4) is received after the retransmit frame (4) is received. In this case, it cannot be judged whether or not the retransmit frame (4) is a retransmit frame or a new frame, whereby the receiving side makes the transition to the abnormal state.

As described in the foregoing, according to the third embodiment, the receiving side makes the transition to the judgment wait state in a case where there is a possibility that an error is included in the frame number of the frame received from the transmitting side when the count value of the counter reaches the frame number preceding the frame number of the oldest of the frames awaiting retransmission. When a frame subsequently received has the same frame number as that of the frame awaiting retransmission, the receiving side holds the frame as a frame awaiting judgment, and judges whether the held frame awaiting judgment is a retransmit frame or a new frame from the initial value of the counter, the frame number of the oldest frame awaiting retransmission, and the frame number of the new frame received after making the transition to the judgment wait state. Therefore, there arises no problem that the received frame (the frame (4) in FIG. 7) is discarded irrespective of the fact that it is a retransmit frame as in the second embodiment, whereby efficient error correction can be made.

In the third embodiment, the number of times of retransmission is limited to the number of times determined from the other factor (for example, the limit of delay time of a video). When the abnormal state defined in the third embodiment occurs before the number of times of retransmission reaches the defined number of times of retransmission, further retransmission may be discontinued, to proceed to processing for reporting the abnormal state to an upper layer, for example.

Figure 10:
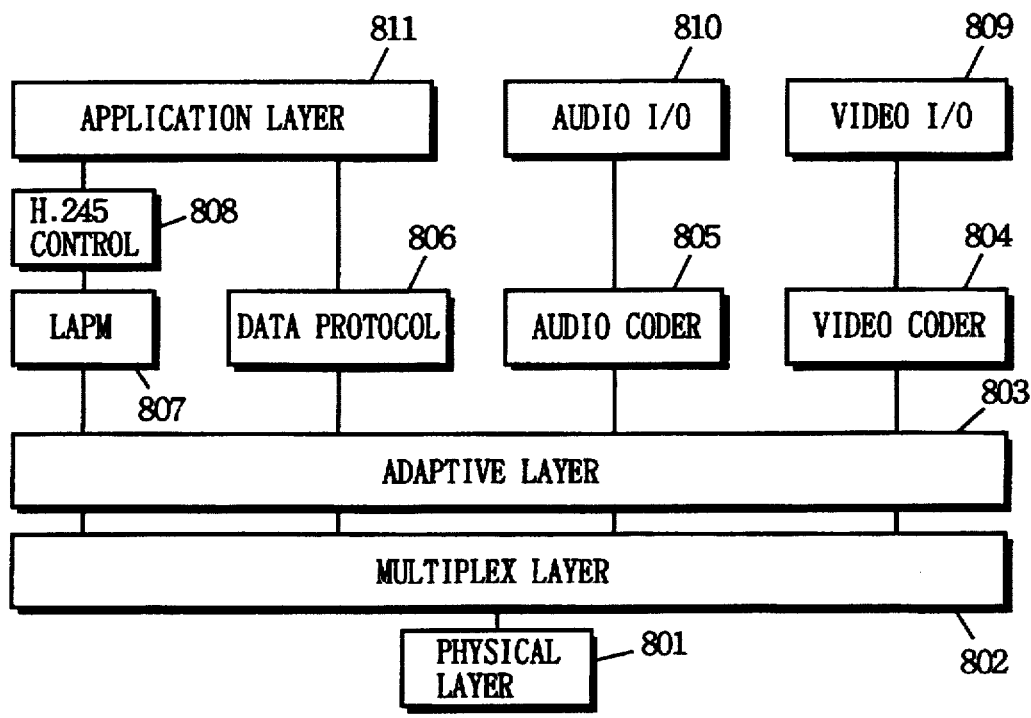

FIG. 10 illustrates a general layer structure of a multiplex transmission device for multiplexing and transmitting video data, audio data, computer data, and the like. In FIG. 10, the multiplex transmission device comprises a physical layer 801, a multiplex layer 802, an adaptive layer 803, a video coder 804, a audio coder 805, a data protocol 806, an LAPM 807, an H. 245 control 808, a video I/O 809, an audio I/O 810, and an application layer 811.

The above-mentioned retransmission control methods in the first to third embodiments are used in making error correction of video data in the adaptive layer 803 shown in FIG. 10. When video data including an error is entered into the video coder 804, a video which is the result of decoding is degraded. When the video coder performing intraframe differential coding is used, the degradation is propagated between the frames, and is not eliminated until intraframe coding data is received.

Figure 11:
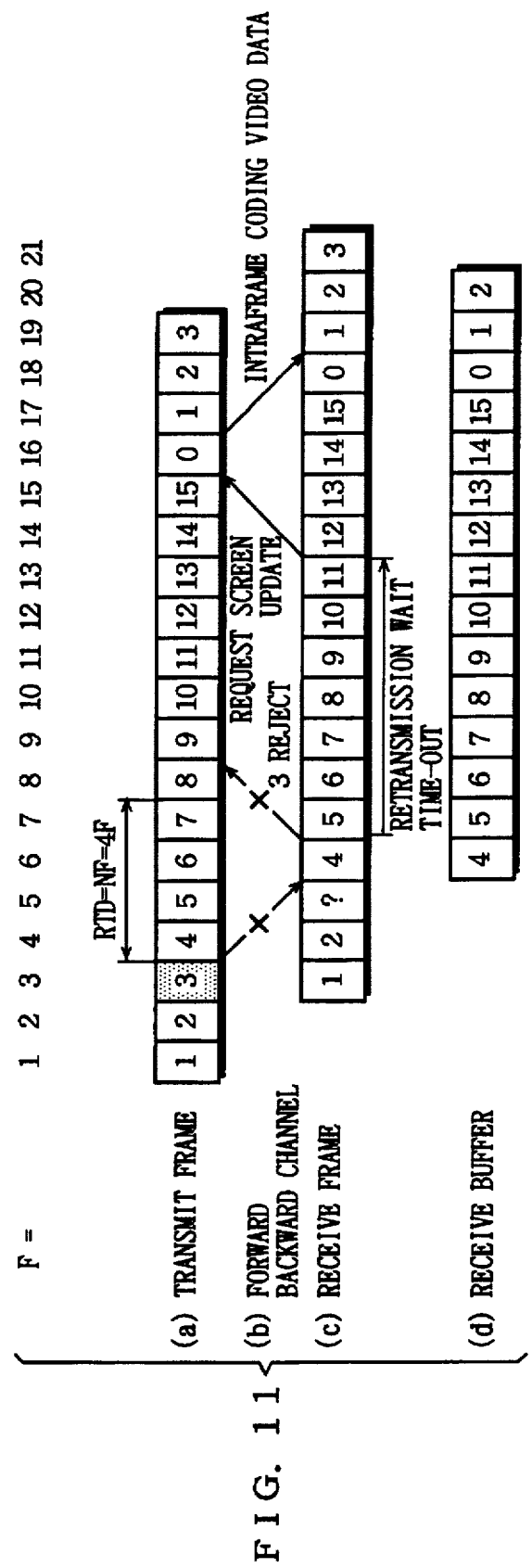
FIG. 11 is a diagram showing an operation sequence in a case where freezing of a screen is released at the time where a video coder shown in FIG. 10 receives an intraframe coding video data without error.
Figure 12:
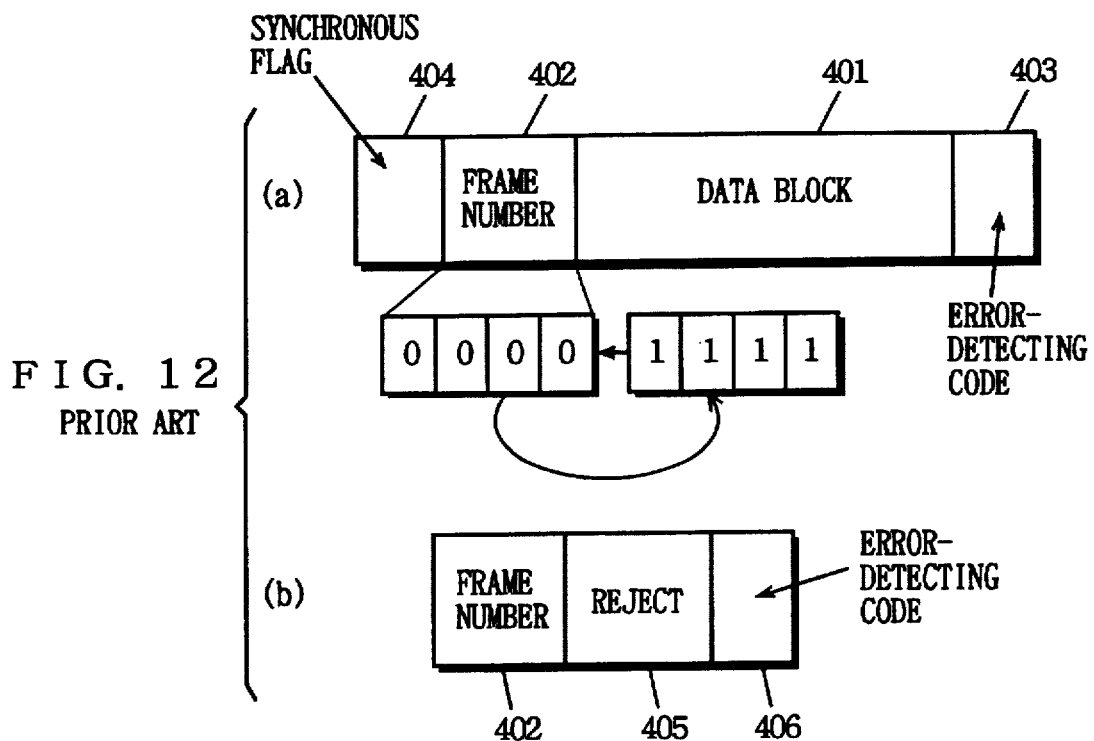
FIG. 12 is a diagram showing a frame structure in a conventional SR retransmission control system.
Figure 13:
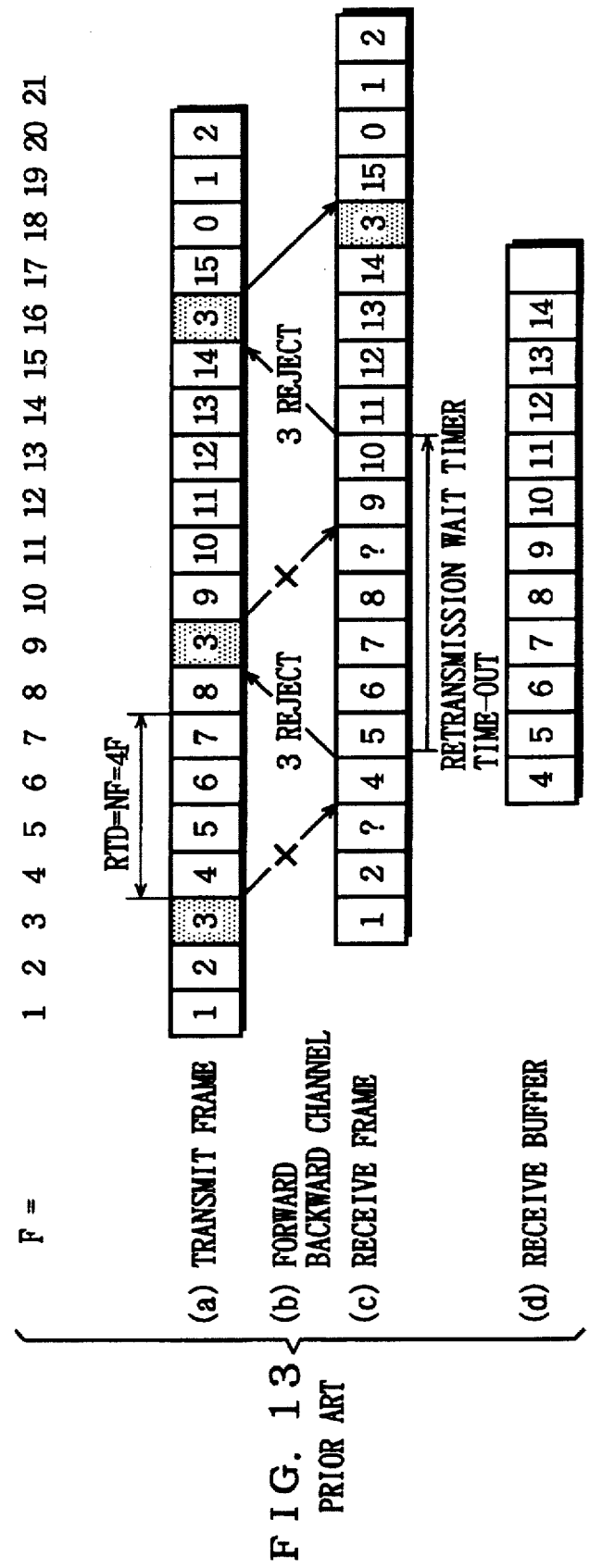
FIG. 13 is a diagram showing one example of transmission/receiving timing in the conventional SR retransmission control system.
Figure 14:
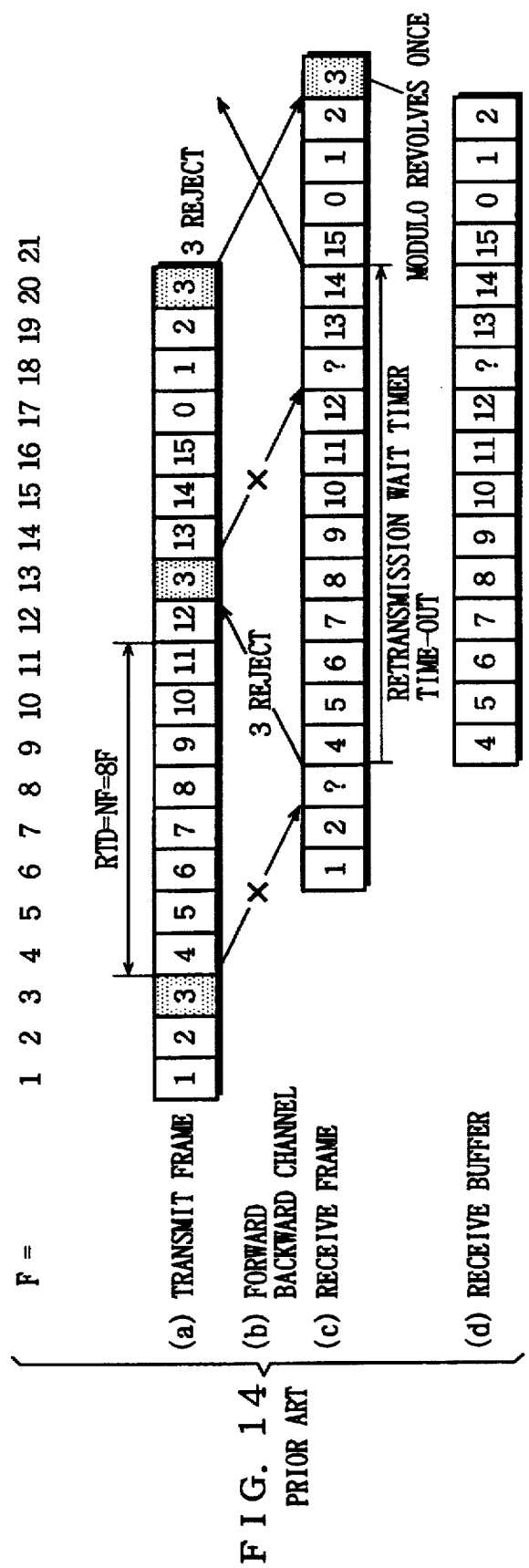
FIG. 14 is a diagram showing an example of retransmission control in a case where a round trip delay period (RTD) is a period corresponding to eight frames.

In the retransmission control method in the first embodiment, when correct data cannot be received even if a retransmission request is made only in the amount of the number of times of retransmission calculated by the equation (6), the adaptive layer 803 terminates retransmission control to transfer to the video coder 804 a dummy frame of the frame awaiting retransmission and information indicating that the frame is a dummy frame. The video coder 804 freezes a screen by a video frame which is being currently displayed and is not degraded to send a screen updating request to a video coder in a multiplex transmission device in a counterpart. The video coder in the multiplex transmission device in the counterpart codes new video data by intraframe coding in response to the screen updating request and transmits the intraframe coding video data. The video coder 804 releases the freezing of the screen at the time where it receives the coded video data by intraframe coding without error. A sequence diagram at this time is illustrated in FIG. 11. FIG. 11 illustrates an operation sequence in a case where M=16, T=12, and P=0 to 3, and the number of times of retransmission is one.

On the other hand, in the retransmission control methods in the second and third embodiments, the adaptive layer 803 terminates retransmission control upon predicting that new and old transmission frames are replaced with each other in accordance with the algorithms shown in FIGS. 6 and 8, and transfers to the video coder 804 a dummy frame of the frame awaiting retransmission and information indicating that the frame is a dummy frame. The video coder 804 freezes a screen by a video frame which is being currently displayed and is not degraded, and sends a screen updating request to a video coder in a multiplex transmission device in a counterpart. The video coder in the multiplex transmission device in the counterpart codes new video data by intraframe coding in response to the screen updating request, and transmits the coded video data by intraframe coding. The video coder 804 releases the freezing of the screen at the time where it receives the coded video data by intraframe coding without error.

On the other hand, when the number of times of retransmission is not limited as in the prior art, the adaptive layer 803 erroneously transfers video data having a new frame number to the video coder 804 as video data having an old frame number. Therefore, the video coder 804 continues to display a degraded video without noticing that video data are replaced with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A retransmission control method, for use with a transmitting side, a receiving side, a timer, and frames of information each having an assigned frame number and to be circulated by a modulo M and continuously transmitted from the transmission side to the receiving side, for performing error correction by controlling retransmission of a frame in which a transmission error occurs, said method comprising:

receiving a frame at the receiving side;

detecting an error in the frame received by the receiving side;

returning from the receiving side to the transmitting side a reject including the assigned frame number of the frame in which the error is detected;

previously determining a maximum number of times Nr a reject of any particular frame is return while the modulo revolves once based on a speed at which the modulo advances when said returning of a reject is repeated only for an arbitrary frame, said retransmitting of the frame is not executed for each occurrence of said returning of the reject of the frame, and all other of the frames are transmitted without error;

retransmitting from the transmitting side to the receiving side the frame corresponding to the frame number included in the reject; and discontinuing returning the reject of the frame before a number of occurrences of returning of the reject of the frame exceeds the maximum number of times Nr;

determining with the timer a time period t from when the reject is returned to when the retransmitted frame is received, and said determining of the maximum number Nr produces a positive integer satisfying the following equation:

$$Nr \leq \{(M-1) \times F - p\}/t,$$

wherein p is a suitable margin, and F is a period required to transmit one frame.

2. The retransmission control method according to claim 1, wherein $t = T \times F$ and $p = P \times F$, and the maximum number of times Nr is determined as a positive integer satisfying the following equation:

$$Nr \leq (M-1-P)/T.$$

3. A retransmission control method, for use with a transmitting side, a receiving side, and frames of information each having an assigned frame number and to be circulated by a modulo M and continuously transmitted from the transmission side to the receiving side, for performing error correction by controlling retransmission of a frame in which a transmission error occurs, said method comprising:

receiving a frame at the receiving side;

detecting an error in the frame received by the receiving side;

returning from the receiving side to the transmitting side a reject including the assigned frame number of the frame in which the error is detected;

previously determining a maximum number of times Nr a reject of any particular frame is returnable while the modulo revolves once in at least one of the receiving side and the transmitting side;

retransmitting from the transmitting side to the receiving side the frame corresponding to the frame number included in the reject; and discontinuing said returning of the reject of the frame before a number of occurrences of said returning of the reject of the frame exceeds the maximum number of times Nr.

4. The retransmission control method according to claim 3, wherein said determining of the maximum number Nr is based on a speed at which the modulo advances when said returning of a reject is repeated only for an arbitrary frame, said retransmitting of the frame is not executed for each occurrence of said returning of the reject of the frame, and all other of the frames are transmitted without error.

5. A retransmission control method, for use with a transmitting side, a receiving side, and frames of information each having an assigned frame number and to be circulated by a modulo M and continuously transmitted from the transmission side to the receiving side, for performing error correction by controlling retransmission of a frame in which a transmission error occurs, said method comprising:

receiving a frame at the receiving side;

detecting an error in the frame received by the receiving side;

returning from the receiving side to the transmitting side a reject including the frame number of the frame in which the error is detected;

retransmitting from the transmitting side to the receiving side the frame corresponding to the frame number included in the reject;

predicting, at the receiving side, the frame number of the frame in which the error occurred based on a frame number of a frame properly received by the receiving side; and discontinuing said returning of the reject and indicating an abnormal state when the reject is of an oldest frame awaiting retransmission and when the frame number predicted by said predicting reaches a number preceding a frame number of the oldest frame awaiting retransmission.

6. The retransmission control method according to claim 5, for further use with a modulo M counter operable for generating a count value, said method further comprising:

receiving a new frame at the receiving side;

setting, at the receiving side, a frame number of the new frame as an initial value in the modulo M counter;

counting, at the receiving side, a number of continuously received frames which include errors and which are received after said receiving of the new frame;

indicating an abnormal state when the count value of the counter reaches the number preceding the frame number of the oldest frame awaiting retransmission.

7. A retransmission control method, for use with a transmitting side, a receiving side, and frames of information each having an assigned frame number and to be circulated by a modulo M and continuously transmitted from the transmission side to the receiving side, for performing error correction by controlling retransmission of a frame in which a transmission error occurs, said method comprising:

receiving a frame at the receiving side;

detecting an error in the frame received by the receiving side;

returning from the receiving side to the transmitting side a reject including the assigned frame number of the frame in which the error is detected;

retransmitting from the transmitting side to the receiving side the frame corresponding to the frame number included in the reject;

predicting, at the receiving side, the frame number of the frame in which the error occurred based on a frame number of a frame properly received by the receiving side;

entering a judgment wait state when the frame number predicted by said predicting reaches a number preceding a frame number of an oldest frame awaiting retransmission;

holding the frame received by the receiving side as a frame awaiting judgment when the frame received by the receiving side, after said entering of the judgment wait state, is a frame having a frame number which is the same as the frame number of the oldest frame awaiting retransmission; and judging whether the frame awaiting judgment is a retransmitted frame on the basis of a frame number of a frame which is received by the receiving side after said holding of the frame as the frame awaiting judgment.

8. The retransmission control method according to claim 7, for further use with a modulo M counter operable for generating a count value, said method further comprising:

receiving a new frame at the receiving side;

setting, at the receiving side, a frame number of the new frame as an initial value in the modulo M counter;

counting, at the receiving side, a number of continuously received frames which include errors and which are received after said receiving of the new frame;

entering the judgment wait state when the count value of the counter reaches the number preceding the frame number of the oldest frame awaiting retransmission.

9. The retransmission control method according to claim 8, further comprising:

storing as a first frame number, upon said entering the judgment wait state, a frame number of a newest frame received at the receiving side before said entering the judgment wait state;

storing as a second frame number, upon said receiving the new frame or upon receiving a frame having a same frame number as the frame awaiting judgment after said holding the frame received by the receiving side as a frame awaiting judgment, a frame number of the new frame or the frame having the same number as the frame awaiting judgment, respectively; and judging whether the judgment wait state is released when the frame number of the oldest frame awaiting retransmission is more than the second frame number or when the first frame number is more than the frame number of the oldest frame awaiting retransmission and the second frame number is more than the first frame number, and otherwise discontinuing said returning of the reject of the oldest frame awaiting retransmission and indicating an abnormal state.

10. The retransmission control method according to claim 9, further comprising:

judging at the receiving side, upon judging whether the judgment wait state is released, whether the receiving side holds the frame awaiting judgment;

releasing the judgment wait state and judging that the frame awaiting judgment is a retransmit frame if the receiving side holds the frame awaiting judgment; and setting the second frame number to the first frame number, setting the count value of the counter to the second frame number, clearing the second frame number, and continuing the judgment wait state, if the receiving side does not hold the frame awaiting judgment.

11. The retransmission control method according to claim 10, further comprising:

counting, at the receiving side, a number of continuously received frames which include errors even after said entering of the judgment wait state, and discontinuing said returning of the reject of the oldest frame awaiting retransmission upon said indicating of the abnormal state when the count value of the counter revolves once.

12. The retransmission control method according to claim 9, further comprising:

judging at the receiving side, upon judging whether the judgment wait state is released, whether the receiving side holds the frame awaiting judgment;

releasing the judgment wait state and judging that the frame awaiting judgment is a retransmit frame if the receiving side holds the frame awaiting judgment; and setting the second frame number in the count value of the counter, clearing the second frame number, and continuing the judgment wait state, if the receiving side does not hold the frame awaiting judgment.

13. A retransmission control apparatus for use with frames of information to be circulated by a modulo M and each having an assigned frame number, for performing error correction by controlling retransmission of a frame in which a transmission error occurs, said apparatus comprising:

a transmitting side operable for transmitting a frame, receiving a reject including a frame number of a frame including an error, retransmitting a frame corresponding to the frame number included in the reject, previously determining a maximum number of times Nr a reject of any particular frame is returnable while the modulo revolves once based on a speed at which the modulo advances when said transmitting side repeats the receiving of the reject only for an arbitrary frame, said transmitting side does not execute the retransmitting of the frame for each occurrence of the returning of the reject of the frame, and all other of the frames are transmitted without error; and a receiving side operable for receiving the frame from said transmitting side, detecting an error in the frame, returning from said receiving side to said transmitting side a reject including a frame number of the frame in which the error is detected by said receiving side, previously determining a maximum number of times Nr a reject of any particular frame is returnable while the modulo revolves once based on a speed at which the modulo advances when said receiving side repeats the returning of the reject only for an arbitrary frame, said transmitting side does not execute the retransmitting of the frame for each occurrence of the returning of the reject of the frame, and all other of the frames are received without error, discontinuing returning of the reject of the frame before a number of occurrences of the returning of the reject of the frame exceeds the maximum number of times Nr;

wherein said receiving side includes a timer and said receiving side is operable for determining with said timer a time period t from when the reject is returned to when the retransmitted frame is received, and the determining of the maximum number Nr by said receiving side produces a positive integer satisfying the following equation:

$$Nr \leq \{(M-1) \times F - p\}/t,$$

wherein p is a suitable margin, and F is a period required to transmit one frame.

14. The retransmission control apparatus according to claim 13, wherein t=T×F and p=P×F, and said transmitting side and said receiving side are operable to determine the maximum number of times Nr as a positive integer satisfying the following equation:

$$Nr \leq (M-1-P)/T.$$

15. A retransmission control apparatus for use with frames of information to be circulated by a modulo M and each having an assigned frame number, for performing error correction by controlling retransmission of a frame in which a transmission error occurs, said apparatus comprising:

a transmitting side operable for transmitting a frame, receiving a reject including a frame number of a frame including an error, previously determining a maximum number of times Nr a reject of any particular frame is returnable while the modulo revolves once, and retransmitting a frame corresponding to the frame number included in the reject; and a receiving side operable for receiving the frame from said transmitting side, detecting an error in the frame, returning from said receiving side to said transmitting side a reject including a frame number of the frame in which the error is detected by said receiving side, previously determining a maximum number of times Nr a reject of any particular frame is returnable while the modulo revolves once, and discontinuing returning of the reject of the frame before a number of occurrences of the returning of the reject of the frame exceeds the maximum number of times Nr.

16. The retransmission control apparatus according to claim 15, wherein said transmitting side and said receiving side are operable to determine the maximum number Nr based on a speed at which the modulo advances when said receiving side repeats the returning of the reject only for an arbitrary frame, said transmitting side does not execute the retransmitting of the frame for each occurrence of the returning of the reject of the frame, and all other of the frames are received without error.

17. A retransmission control apparatus for use with frames of information to be circulated by a modulo M and each having an assigned frame number, for performing error correction by controlling retransmission of a frame in which a transmission error occurs, said apparatus comprising:

a transmitting side operable for transmitting a frame, receiving a reject including a frame number of a frame including an error, retransmitting a frame corresponding to the frame number included in the reject;

a receiving frame operable for receiving the frame from said transmitting side, detecting an error in the frame, returning from said receiving side to said transmitting side a reject including the frame number of the frame in which the error is detected, predicting the frame number of the frame in which the error was detected based on a frame number of a frame properly received by said receiving side, and discontinuing the returning of the reject and indicating an abnormal state when the reject is of an oldest frame awaiting retransmission and when the frame number predicted by said receiving side reaches a number preceding a frame number of the oldest frame awaiting retransmission.

18. The retransmission control apparatus according to claim 17, further comprising:

a modulo M counter operable for generating a count value;

wherein said receiving side is operable for receiving a new frame, setting a frame number of the new frame as an initial value in the modulo M counter, counting a number of continuously received frames which include errors and which are received after the new frame is received by said receiving side, and indicating an abnormal state when the count value of said counter reaches the number preceding the frame number of the oldest frame awaiting retransmission.

19. A retransmission control apparatus for use with frames of information to be circulated by a modulo M and each having an assigned frame number, for performing error correction by controlling retransmission of a frame in which a transmission error occurs, said apparatus comprising:

a transmitting side operable for transmitting a frame, receiving a reject including a frame number of a frame including an error, retransmitting a frame corresponding to the frame number included in the reject;

a receiving side operable for receiving the frame from said receiving side, detecting an error in the frame, returning from said receiving side to said transmitting side a reject including the assigned frame number of the frame in which the error is detected, predicting the frame number of the frame in which the error was detected based on a frame number of a frame properly received by said receiving side, entering a judgment wait state when the frame number predicted by said receiving side reaches a number preceding a frame number of an oldest frame awaiting retransmission, holding the frame received by said receiving side as a frame awaiting judgment when the frame received by said receiving side, after entering of the judgment wait state, is a frame having a frame number which is the same as the frame number of the oldest frame awaiting retransmission, and judging whether the frame awaiting judgment is a retransmitted frame on the basis of a frame number of a frame which is received by said receiving side after the holding of the frame as the frame awaiting judgment.

20. The retransmission control apparatus according to claim 19, further comprising:

a modulo M counter operable for generating a count value;

wherein said receiving side is operable for receiving a new frame, setting a frame number of the new frame as an initial value in the modulo M counter, counting a number of continuously received frames which include errors and which are received after the new frame is received by said receiving side, and entering the judgment wait state when the count value of said counter reaches the number preceding the frame number of the oldest frame awaiting retransmission.

21. The retransmission control apparatus according to claim 20, wherein said receiving side is operable for storing as a first frame number, upon entering the judgment wait state, a frame number of a newest frame received by said receiving side before entering the judgment wait state, storing as a second frame number, upon receiving the new frame or upon receiving a frame having a same frame number as the frame awaiting judgment after holding the frame received by the receiving side as a frame awaiting judgment, a frame number of the new frame or the frame having the same number as the frame awaiting judgment, respectively, and judging whether the judgment wait state is released when the frame number of the oldest frame awaiting retransmission is more than the second frame number or when the first frame number is more than the frame number of the oldest frame awaiting retransmission and the second frame number is more than the first frame number, and otherwise discontinuing the returning of the reject of the oldest frame awaiting retransmission and indicating an abnormal state.

22. The retransmission control apparatus according to claim 21, wherein said receiving side is operable for judging whether the receiving side holds the frame awaiting judgment, upon judging whether the judgment wait state is released, releasing the judgment wait state and judging that the frame awaiting judgment is a retransmit frame if said receiving side holds the frame awaiting judgment, and setting the second frame number to the first frame number, setting the count value of the counter to the second frame number, clearing the second frame number, and continuing the judgment wait state, if said receiving side does not hold the frame awaiting judgment.

23. The retransmission control apparatus according to claim 22, wherein said receiving side is operable for counting a number of continuously received frames which include errors even after entering of the judgment wait state, and discontinuing the returning of the reject of the oldest frame awaiting retransmission upon the indicating of the abnormal state by said receiving side when the count value of the counter revolves once.

24. The retransmission control apparatus according to claim 21, wherein said receiving side is operable for judging whether the receiving side holds the frame awaiting judgment, upon judging whether the judgment wait state is released, releasing the judgment wait state and judging that the frame awaiting judgment is a retransmit frame if said receiving side holds the frame awaiting judgment; and setting the second frame number in the count value of said counter, clearing the second frame number, and continuing the judgment wait state, if said receiving side does not hold the frame awaiting judgment.

* * * * *